ates Patent  [19]  [11] 3,723,149
United States Patent [19]
Cole et al. [45] Mar. 27, 1973

[54] TREATMENT OF TITANIUM DIOXIDES

[75] Inventors: Colin Francs Cole; Stanley Powell, both of Stockton-on-Tees, England

[73] Assignee: British Titan Limited, Billingham, Teesside, England

[22] Filed: Mar. 18, 1971

[21] Appl. No.: 125,881

[30] Foreign Application Priority Data

Mar. 21, 1970 Great Britain.....................13,780/70

[52] U.S. Cl..............................106/300, 106/308 N
[51] Int. Cl.................................................C09c 1/36
[58] Field of Search...........................106/300, 308 N

[56] References Cited

UNITED STATES PATENTS 2,737,460  3/1956  Werner..................................106/300
3,412,944  11/1968  Wollenberg..........................106/300

*Primary Examiner*—James E. Poer
*Attorney*—Birch, Swindler, McKie & Beckett

[57] ABSTRACT

A process for the neutralization of pyrogenic titanium dioxide in which the dioxide is treated with steam at a temperature not exceeding 300°C in order that the majority of the acidity of the pigment may be removed and with a vapor of an organic amine to enable the neutralization process.

9 Claims, No Drawings

TREATMENT OF TITANIUM DIOXIDES

DESCRIPTION OF THE INVENTION

This invention relates to the treatment of titanium dioxide and particularly to treatment of pyrogenic titanium dioxide.

By the term "pyrogenic titanium dioxide" as referred to in this Specification is meant titanium dioxide that has been prepared by the vapor phase oxidation of a titanium halide, usually titanium tetrachloride at an elevated temperature. In this process, the titanium tetrahalide is oxidized, usually in the presence of one or more crystal modifying agents and/or rutilizing agents to produce a pigmentary form of titanium dioxide. The particles of titanium dioxide usually are acidic due to the presence on the surface of the particles of unreacted chlorides and/or oxychlorides and chlorine. This acidic nature renders the pigment unsuitable for use in many applications unless steps are taken to reduce the acidity and preferably to produce a pigment that is neutral.

According to the present invention a process for the neutralization of pyrogenic titanium dioxide comprises treating the titanium dioxide with steam at a temperature not exceeding 300°C to remove the majority of the acidity of the pigment and with a vapor of an organic amine to produce a substantially neutral pigment.

The process of the invention preferably involves two steps. In the first step, the pyrogenic titanium dioxide whose surface is acidic is treated with steam at a temperature not exceeding 300°C and preferably not exceeding 200°C during which process the bulk of the acidity of the pigment is neutralized. However, this treatment does not effect the neutralization of the whole of the acidity of the pigment since it is extremely difficult to achieve this by the use of steam and accordingly the remaining acidity is neutralized by treating the steam-heat-treated pigment with the vapor of an organic amine.

The temperature at which the pigment is treated with steam and the time of such treatment depends on the degree of acidity of the pigment prior to treatment but it is preferred that the temperature of the treatment should not exceed 200°C. The most preferred temperature of treatment is about 150°C for a length of time sufficient to remove the bulk of the acidity. This time required can be easily determined by testing samples of the pigment during the course of the treatment with the steam by titrating a slurry of the pigment with sodium hydroxide. By this means, it is possible to determine the extent of the neutralization that has taken place when compared with the acidity of the pigment prior to treatment.

The remaining acidity after treatment with steam is neutralized by treatment with an organic amine, preferably an aliphatic amine. The amine will usually be a monoamine and preferably the amine boils at a temperature in excess of 100°C at atmospheric pressure. Typical amines which can be used with advantage are di-n-propylamine, tri-n-propylamine, n-butylamine, n-amylamine, n-hexylamine, laurylamine, n-octylamine and diethanolamine. The particular choice of the amine also depends on the desired treatment temperature and the amine should be such that it is volatile and stable at this treatment temperature in order to ensure intimate contact of the vapor of the amine with the surface of the pigmentary titanium dioxide.

The use of an amine having a boiling point greater than 100°C ensures that the neutralized pigment has a substantially stable pH. It is believed that the amine becomes associated with the surface of the pigment and at least some of the amine is retained on the surface after treatment.

If desired, however, the treatment of the titanium dioxide with steam and an amine can be effected in one step. To perform this it is necessary for the amine to be volatile at the treatment temperature. The concentration of the amine will depend on the degree of acidity of the pigment, the more acidic the pigment the higher the concentration of amine.

In the steam treatment, pure steam is preferred but it is possible to use mixtures of steam with other gases, e.g., steam and air, steam and oxygen or the products of combustion of a hydrogenous fuel which may advantageously provide a source of heat as well as the necessary steam. Usually, however, the steam will be generated by any one of the well-known methods.

The pyrogenic titanium dioxide prior to treatment according to the process of the present invention may have been coated in the vapor phase by one or more metal oxides, such as alumina, titania, zirconia, ceria and silica. In this coating process, the titanium dioxide produced by the vapor phase oxidation of the titanium tetrahalide is treated as a gaseous suspension with an oxidizable compound of the coating metal which may be a compound of aluminum, cerium, zirconium or silicon, in such a manner as to deposit on the surface of the titanium dioxide particles a coating of the particular oxide.

The titanium dioxide may be prepared in any one of the well-known ways, for example, by oxidation of titanium tetrachloride in a fluid bed or in an empty reactor in which the oxygen is usually heated by appropriate means. Suitable means for heating the oxygen are the use of a fuel burner, an electrically augmented flame or an electric arc. As stated previously, various crystal modifying agents and/or rutilizing agents may be present during the vapor phase oxidation to produce the desired type of titanium dioxide. Generally, for example, a small proportion of aluminum chloride (with or without silicon tetrachloride) may be co-burnt with the titanium tetrachloride to promote the formation of rutile titanium dioxide.

The process for the neutralization of pyrogenic titanium dioxide according to the present invention produces a pigment having enhanced dispersion in a paint media when compared with previously known techniques of neutralization for example, those involving the high temperature treatment of a pyrogenic titanium dioxide with steam. These techniques involve the treatment of titanium dioxide with steam at a temperature of the order of 500°C with or without the addition of boron compounds. Such a treatment tends to dehydroxylate the surface of the pigment and to reduce the surface area. In addition, there is a tendency to cause aggregates of pigment particles to form which are difficult, if not impossible, to break down to achieve adequate dispersion of the particles in paint media.

The titanium dioxide produced by the process of the present invention can be used in a wide variety of applications and can be used in many types of paints including oleoresinous paints and water-bases emulsion paints.

The invention is illustrated in the following Examples:

EXAMPLE 1

An acidic pyrogenic titanium dioxide pigment obtained from the vapor phase oxidation reactor was treated at 150°C for 60 minutes with pure steam. Normal-hexylamine was then added to the pigment in an amount sufficient to effect complete neutralization as determined by titration with sodium hydroxide. The treatment with normal-hexylamine was effected in a closed system at 110°C for a short time to ensure that all the pigment had contacted the amine.

The pigment was then used to prepare an oleoresinous paint in which the milling time required to disperse the pigment in the paint media was found to be 1½ to 2 hours to develop the maximum opacity of the resultant paint.

Another sample of the pyrogenic titanium dioxide pigment was treated with steam for 60 minutes at 500°C to produce a neutral pigment. A sample of this pigment was then used to prepare a paint similar to that described above and the milling time required to develop the maximum opacity in the paint was found to be 18 to 21 hours.

The results clearly show that the neutralization of the acidic titanium dioxide pigment by the use of steam and an amine is effective in reducing the acidity of the pigment and in producing a pigment that disperses very easily in a paint medium as compared to treatment of an acidic pigment with steam alone and at a high temperature.

EXAMPLE 2

A sample of the acidic pyrogenic titanium dioxide pigment used in Example 1 was neutralized with steam as described in Example 1 at 150°C for 60 minutes, and subsequently treated with an amine but in this case the amine was n-butylamine. The conditions of treatment were similar to those described in Example 1.

The neutralized pigment required a milling time of 2 to 3 hours in a similar paint medium to that described in Example 1 to produce maximum opacity in the paint film.

What is claimed is

1. A process for the neutralization of an acidic pyrogenic titanium dioxide which comprises treating the acidic pyrogenic titanium dioxide with steam at a temperature not exceeding 300°C and for a time sufficient to remove the majority of the acidity of the pigment and then with a vapor of an alkyl amine having a boiling point in excess of 100°C to produce a substantially neutral pigment.

2. A process according to claim 1 in which the titanium dioxide is treated with steam at a temperature not exceeding 200°C.

3. A process according to claim 2 in which the temperature is about 150°C.

4. A process according to claim 1 in which the amine is a monoamine.

5. A process according to claim 1 in which pure steam is used.

6. A process according to claim 1 in which mixtures of steam with other gases are used.

7. A process according to claim 1 in which the titanium dioxide has a coating of one or more metal oxides.

8. A process according to claim 7 in which the metal oxide is alumina, titania, zirconia, ceria or silica.

9. A process for the neutralization of an acidic pyrogenic titanium dioxide which comprises simultaneously treating at a temperature not exceeding 300°C the acidic pyrogenic titanium dioxide with steam and a vapor of an alkyl amine having a boiling point in excess of 100°C for a time sufficient to produce a substantially neutral pigment.

* * * * *